March 28, 1944.  B. C. PLACE  2,345,004
FASTENER
Filed Feb. 27, 1941
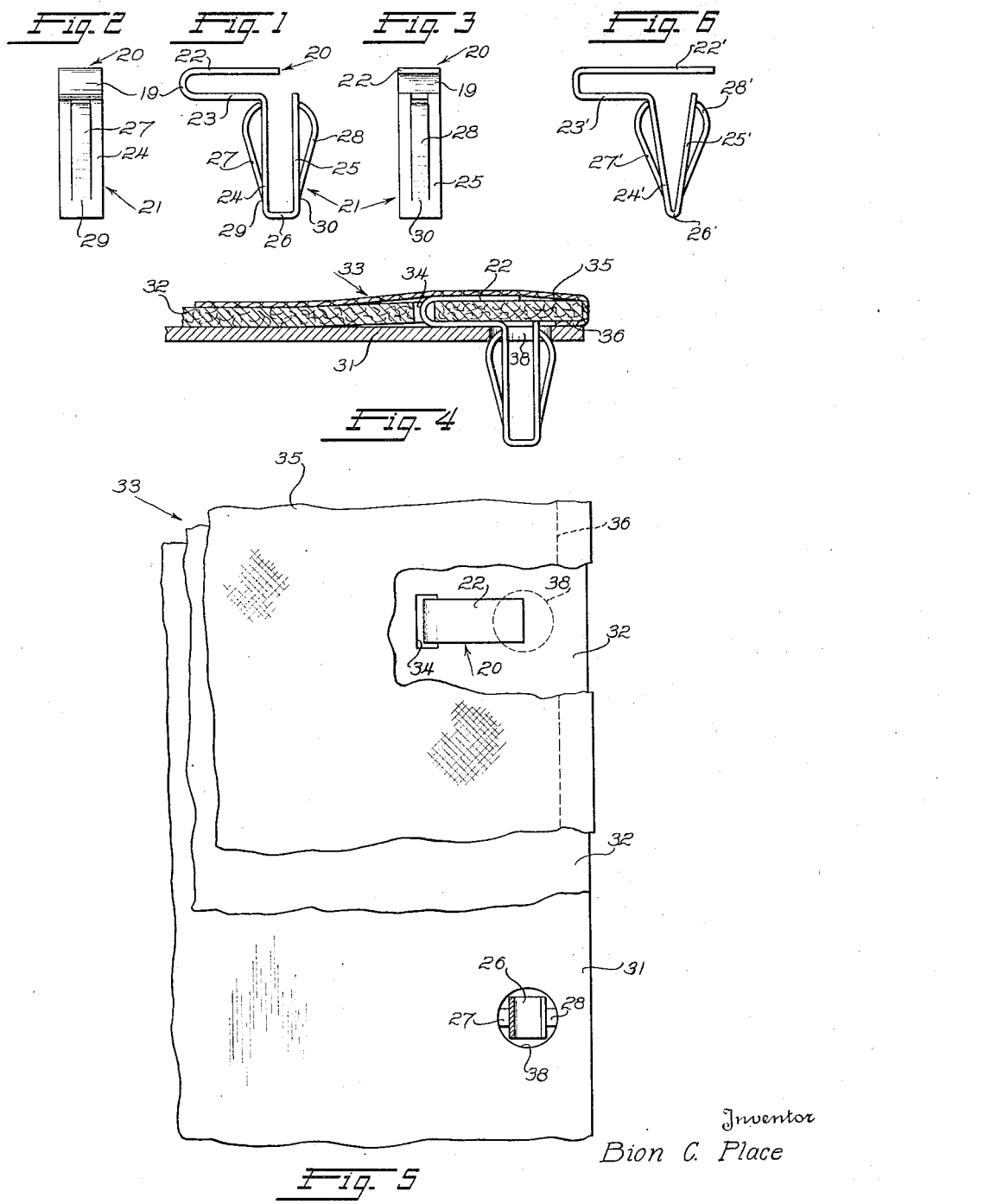
Inventor
Bion C. Place
By Strauch & Hoffman
Attorneys Patented Mar. 28, 1944

2,345,004

UNITED STATES PATENT OFFICE 2,345,004

FASTENER

Bion C. Place, Detroit, Mich., assignor of one-half to George E. Gagnier, Detroit, Mich.

Application February 27, 1941, Serial No. 380,919

1 Claim. (Cl. 45—138)

The present invention relates to spring stud fasteners constructed from sheet metal. More particularly, the invention involves a sheet metal fastener having a hook-like head part and a stud part having a resilience comparable to the resilience obtainable in a spring stud fastener constructed from wire. The present application is a continuation-in-part of application Serial No. 268,387, filed April 17, 1939.

Spring fasteners heretofore proposed are being widely used to successfully attach trim panels, moldings, wires, cables, conduits and the like to parts of automobile or similar bodies. Fasteners of this type are either constructed by bending a piece of wire into appropriate form, or from sheet metal by stamping a fastener blank from a sheet of metal and then bringing the fastener to the desired form. Wire fasteners, as heretofore constructed, have generally been regarded as superior to sheet metal fasteners, because the stud part of the fastener may readily be brought into a form in which it is effective to hold the supported part in snug engagement with the supporting structure, regardless of manufacturing variations in the supporting and supported structure. This characteristic of wire spring stud fasteners is in large measure due to the fact that wire inherently possesses greater resilience than is obtainable in fastener portions made from sheet metal.

The primary purpose of the present invention is to provide a sheet metal spring stud fastener having a stud part from one end of a strip of sheet metal, bent and cut to provide a primary resilience to said part and to provide other independently movable and flexible portions that contribute a secondary resilience to said part.

Still another object of the invention is to provide an improved sheet metal fastener constructed from an elongated strip of sheet metal of uniform width from end to end from one end of which the head part of the fastener is formed, and from the remainder of which the stud part thereof is made, and in which portions of the stud part are separated from other portions thereof to permit independent movement of the separated portions with respect to the remainder of the stud part, which in itself is resilient and yieldable.

A still further object of the invention is to provide a sheet metal fastener the stud part of which consists only of two legs connected only at the entering end of said part, one leg free of the head part, thus providing a high degree of resilience to said part, and in which portions of the legs are struck therefrom to provide separately functioning elements contributing their own inherent resilience to the resilience of the stud part considered as a whole.

A still further object of the invention is to provide an improved sheet metal fastener including independently movable shoulder carrying elements formed as a part of the two legs, constituting a part of the stud portion of the fastener, in which the shoulders provided on the shoulder carrying elements are inclined with respect to lines parallel to a plane bisecting the stud of the fastener longitudinally and in which one leg depends from the head part and the other is connected to said one leg only adjacent the end of the stud part whereby the fastener is very effective to wedge the supported and the supporting parts together after it has been engaged in an aperture in the supporting structure.

A still further object of the invention is to provide an improved sheet metal fastener especially designed to be brought into hooked engagement with a trim panel or the like and having a stud formed from one end of the sheet metal blank in a manner to draw and maintain the panel in snug engagement with the support by virtue of the unusual resilience possessed by the stud part of the fastener.

A still further object of the invention is to provide a highly resilient sheet metal hook-head fastener of a form capable of being cut without waste from sheet metal, and of being formed in a number of sizes from the same mating dies and in a number of shapes by simple and inexpensive variation of said dies, by virtue of the fact that the hook-like head part is fabricated from one end of a strip of sheet metal and the stud part from the other end of said strip.

Still further objects of the invention will appear as the description thereof proceeds with reference to the accompanying drawing, in which:

Figures 1, 2 and 3 are respectively edge, back and front views of a preferred form of hook-head sheet metal fastener including the present invention;

Figure 4 is a fragmentary sectional view showing how the fastener of Figures 1, 2 and 3 is utilized in attaching a trim panel to a supporting structure;

Figure 5 is a fragmentary top plan view of the parts shown in Figure 4, portions of the panel cover and foundation being broken away to show how the fastener is associated with the foundation and the supporting structure; and Figure 6 is an edge view of a modified form of fastener.

Like reference characters indicate like parts throughout the several figures.

A preferred form of fastener illustrated in Figures 1, 2 and 3 comprises a head part 20 and a stud part 21. The head part 20 comprises one end portion of a strip of metal of uniform width from end to end bent to provide a hook-like structure providing substantially parallel arms 22 and 23 united by a connecting portion 19. The other end of the strip of metal is bent into U-shape to provide legs 24 and 25, said legs providing the stud part of the fastener. The strip of metal is properly tempered so as to be resilient. Legs 24 and 25 are accordingly resiliently united by the portion 26 at the entering end of the stud part. Suitable incisions are cut in the legs 24 and 25 separating shoulder carrying elements 27 and 28 from said legs. Said shoulder bearing elements are bent out of the plane of the legs as illustrated in Figure 1 providing surfaces that first diverge from the end of the stud part and then converge toward the head part. Inasmuch as the metal from which the elements 27 and 28 are formed is tempered, it will be understood that said elements are yieldably connected to the legs 24 and 25, the points of flexure being respectively designated by the numerals 29 and 30.

The fastener just described is used in the manner illustrated in Figures 4 and 5, in which the stud part 21 is passed through an aperture 38 in a supporting structure 31, and in which the head part 20 is hooked into engagement with the foundation 32 of a trim panel 33 through an opening 34 in said foundation. The foundation is covered with a suitable fabric 35 lapped around the edges of the foundation, as illustrated at 36.

After the hooked engagement between the head of the fastener and the foundation has been effected, the stud part of the fastener is forced into aperture 38, said part serving to draw the foundation 32 against the outer surface of the supporting structure 31 because of the fact that the rounded shoulders on the elements 27 and 28 adjacent the head part bear against the inner corner of the wall provided by the aperture 38 in said structure. Since these shoulders are relatively sharply inclined, or disposed at an acute angle with respect to a line parallel to a plane bisecting the stud part of the fastener, the resilient elements 27 and 28 exert a force wedging the foundation 32 and the structure 31 into firm contact with each other. The effectiveness of the action just described is due to the fact that the stud part of the fastener is provided with a primary resilience, in the connection 26 between the legs 24 and 25, and a secondary resilience due to the inherent resilience of the elements 27 and 28 struck from said legs. Further resilience is provided in the stud part because of the fact that the leg 25 is the free end of the strip of metal from which the fastener is made, said leg being free of connection to the head part and connected to the other leg 24 only at the entering end of the stud part. Accordingly, when the stud part is forced into the aperture 38 the legs may be forced towards each other against the action of portion 26 which tends to hold them apart, and at the same time the elements 27 and 28 are bent with respect to their points of flexure 29 and 30. It will be thus understood that the stud part of the fastener possesses an unusual resilience and an effectiveness in drawing the foundation toward the support. This effectiveness is made apparent if, after the trim panel is secured against a supporting structure, said panel is pried away from the structure a small distance by means of a suitable tool. Upon the withdrawal of the tool the resilient shank of the fastener will automatically pull or snap the panel back into position in firm contact with the supporting structure.

Accordingly, the trim panel will lie flat against said structure 31 regardless of minor variations in the diameter of the opening 38 or in the thickness of the metal of the supporting structure 31 or in the thickness of the foundation 32, the yieldable shoulders provided on the elements 27 and 28 yielding more or less to automatically take care of such variations.

In Figure 6 a modified fastener is illustrated made from a strip of metal of uniform width, in which the stud part is formed from an end of the strip by bending said end into V-shaped form providing interconnected legs 24' and 25' from which are struck the shoulder-bearing elements 27' and 28', in a manner already described. The other end of the strip of metal is bent into the form of the hook having spaced arms 22' and 23' which serve to grip the part to be held by the fastener between them. The arm 22' may be elongated, as shown, so as to extend well beyond the depending stud part so as to bear upon the foundation even to the margin thereof. This form of the invention constitutes a hook-on fastener having the improved stud part already described, but providing a V-shaped, rather than a U-shaped, connection between the legs of the stud part. If the fastener is used to secure trim panels, it is hooked on the foundation in a manner now known in the art. If it is to be used in securing cable, conduits or the like, the arms 22' and 23' of the hook may be formed to embrace the cable, or conduit to be secured by the fastener in a manner understood in the art.

It will be readily understood that there is no waste of metal in the formation of a fastener from a blank such as illustrated in Figures 1, 2, 3 and 6. Inasmuch as the incisions in the portions of the blank that form the legs of the stud part are exactly the same, it will be understood that the same dies may be used to form the blank for a fastener having wider elongated portions, and that it can be used to form fasteners having elongated portions of greater or less width within reasonable limits. Fasteners of varying width and shape in the head part may readily be constructed from the other end of the strip of metal, such various head parts being formed by merely bending the strips transversely at the proper points after cutting the blanks to the length desired, variations in length of the blank being obtainable without requiring special dies.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A sheet metal spring stud fastener having a head part formed from one end portion of a metal strip and a stud part formed from the other end portion of said strip, said stud part comprising two legs resiliently connected together only at the entering end of said stud part, one of said legs including an end of said strip, said end being substantially spaced from the other leg and thus being free to move substantially in and adjacent to the under surface plane of said head part and terminating at or adjacent to said plane, and tongues separated from said legs and curved toward each other to provide snap fastener engagement with the wall of an opening or socket when the stud part is inserted therein.

BION C. PLACE.